Jan. 25, 1938. L. G. BATES 2,106,545
GLASS FEEDING APPARATUS
Filed April 29, 1936
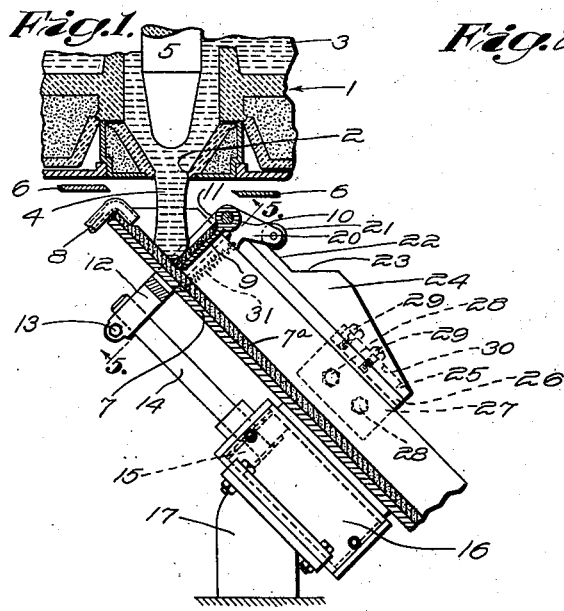
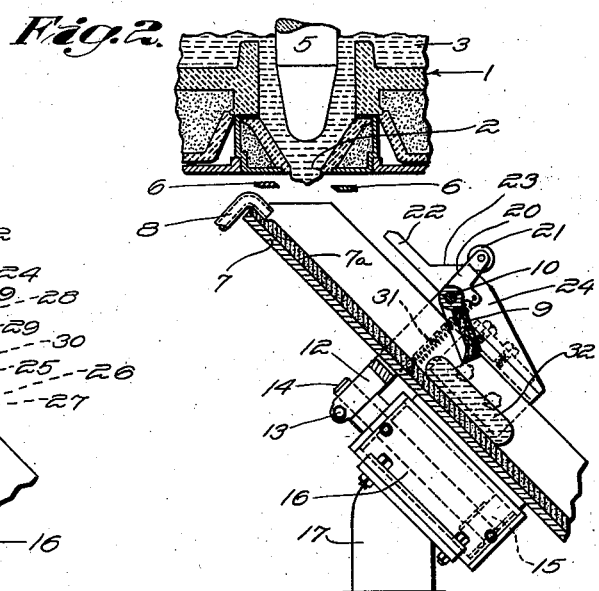
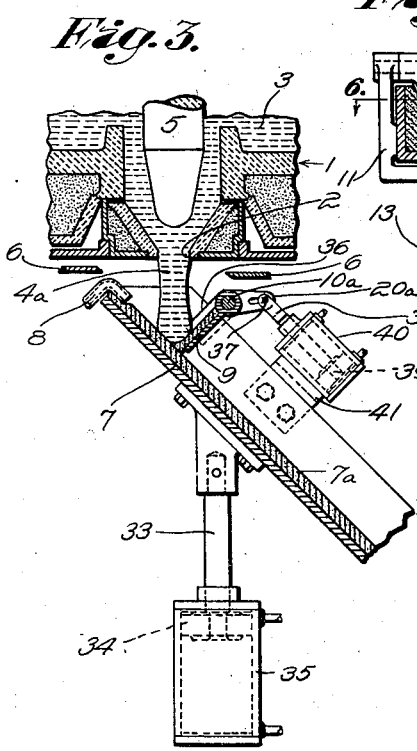
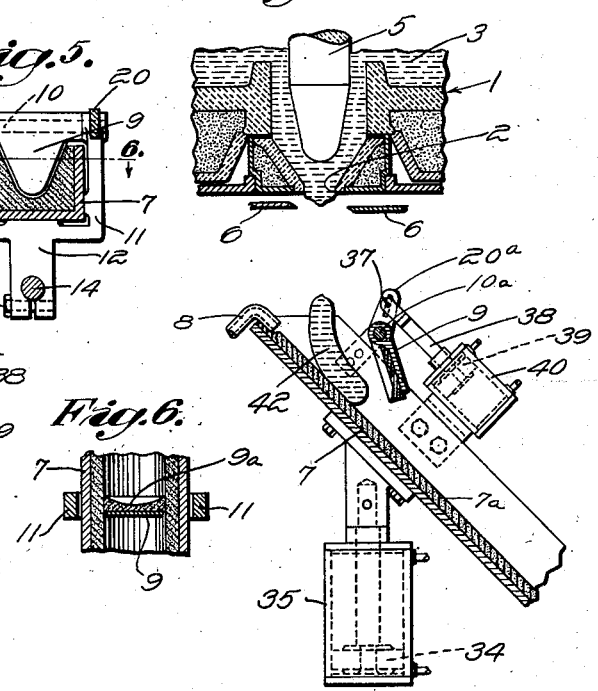
Witness:
W. B. Thayer
Inventor:
Lloyd G. Bates
by Brown + Parham
Attorneys Patented Jan. 25, 1938

2,106,545

UNITED STATES PATENT OFFICE 2,106,545

GLASS FEEDING APPARATUS

Lloyd G. Bates, West Hartford, Conn., assignor to Hartford-Empire Company, Hartford, Conn., a corporation of Delaware Application April 29, 1936, Serial No. 76,985

10 Claims. (Cl. 49—55)

This invention relates generally to improvements in apparatus for feeding molten glass from a container, such as a forehearth or extension of a glass melting furnace, to a glassware forming machine.

The invention relates more particularly to improvements in glass feeding apparatus of the type having a means for temporarily receiving and supporting the lower end portion of each column or stream of glass that descends from a downwardly opening discharge outlet of such a container during the formation of a portion of such column or stream into a charge, which, when formed, is severed by periodically acting severing mechanism.

The present invention contemplates the use of an inclined trough or chute not only as a means for conducting a separated charge of glass to a point below and laterally of the line of the glass feeding outlet, but also as part of a means for controlling the formation of such charge before it has been severed from the glass of a supply column or stream that has issued from a feed outlet of a container.

According to the present invention, a member supplemental to and cooperating with such an inclined trough or chute and a portion of the latter receive and support the lower end portion of a descending column or stream of glass below the feed outlet and by retarding or regulating the rate of downward movement of the supported glass, aid in controlling the formation of the portion of the column or stream which, when severed, will constitute the mold charge desired. Provision may be made for moving the supported glass of the supply column or stream downwardly during the formation of each such charge at a rate and to an extent which may be regulated as required to produce a charge of the desired length, size and shape. To this end, both the trough and its supplemental and cooperative glass supporting member may be moved downwardly as a unit while in supporting contact with the lower end portion of the supply column or stream to control the formation of each charge or the supplemental member alone may be moved downwardly along the trough or chute for this purpose. In either case, the supplemental member is actuated to clear the glass of the formed charge at or immediately before or after the severance of such charge from the supply column or stream, so that the severed charge may slide down the inclined trough or chute for delivery to an associate glassware forming machine.

Other novel features and various advantages of the invention will hereinafter be pointed out or will be obvious from the following description of two particular structural embodiments thereof, which are shown in detail in the accompanying drawing, in which:

Figure 1 is a fragmentary vertical sectional view showing a form of construction in which the supplemental glass supporting member is movable relatively to its associate trough or chute during the formation of a mold charge, the view showing the trough and its supplemental member supporting the lower end portion of the supply column or stream of glass below a feeder outlet at the beginning of a cycle of operations for the formation and separation of a complete charge;

Fig. 2 is a view similar to Fig. 1, but showing the supplemental member at the lower end of its path of movement along the associate trough or chute and after it has been moved to position to permit the severed charge to slide down the trough or chute;

Fig. 3 is a view, similar to Fig. 1, but showing a form of structure in which the trough or chute and the supplemental glass forming and shaping member are movable downwardly as a unit during the formation of a charge;

Fig. 4 is a view, similar to Fig. 2, but showing the form of structure of Fig. 3 with the trough or chute and its associate supplemental member in their lowermost positions just after the charge has been severed and with the supplemental member in position to clear the separated charge so that it may slide down the trough or chute;

Fig. 5 is a section substantially along the line 5—5 of Fig. 1, showing the cross sectional configuration of a suitable trough or chute for use in either of the above-mentioned structures, the view also showing the shape of the associate supplemental glass supporting and shaping member as viewed from the rear; and Fig. 6 is a section substantially along the line 6—6 of Fig. 5, showing the configuration of the inner surface of the supplemental glass supporting and shaping member and illustrating the manner in which it cooperates with a portion of the trough or chute to serve as a receptacle for temporarily supporting the lower end of the supply column or stream of glass.

Referring now to the drawing, and more particularly to Fig. 1, the numeral 1 designates a bottom portion of a glass feeding container, such as a forehearth or melting furnace extension. A feed outlet 2 is provided in the container bottom 1 to permit glass from a supply body 3 to issue from the container in a descending stream or column 4. The flow of glass to and through the outlet 2 may be regulated by a vertically disposed refractory implement 5, which may be maintained stationary during glass feeding operations with its lower end in a vertically adjusted position with respect to the lower end of the feed outlet. If desired, the implement 5 may be reciprocated vertically during glass feeding operations.

Shear blades 6 may be provided for severing the descending column or stream of glass at a plane spaced below the outlet. These blades may be supported and operated by any suitable known mechanism and are intended to represent suitable periodically acting regulably timed severing means.

The parts described so far are shown only fragmentarily because they may be of any suitable known structure, many examples of which are known in the glass feeding art.

A trough or chute 7 is disposed below the feed outlet so that the lower end of the descending column or stream of glass 4 will be supported by an upper portion of such trough or chute. The component structural parts and the cross sectional configuration of the trough or chute may vary from those shown according to preference or to meet particular service requirements.

As shown, the trough or chute has an inner lining 7a of brush carbon or other heat resistant material which may be relatively hot without causing molten glass to stick thereto. A suitable means, represented by the nozzle 8, may be provided for discharging a fluid or liquid onto the inner surface of the trough so as to lubricate the glass conducting surface of the latter and provide a gaseous or liquid film between it and the glass therein.

A supplemental glass supporting and shaping member 9, the provision of which constitutes an important feature of the present invention, may have its inner surface formed to curve concavely both transversely and longitudinally thereof, as shown at 9a in Fig. 6. In general, the shape of the member 9 preferably is such that this supplemental member and the cooperative portion of the trough or chute 7 will form a glass supporting receptacle which will support the lower end portion of the descending column or stream of glass and maintain or give to such supported glass a shape appropriate for the mold that is to be charged.

The glass contacting portion of the member 9 may be formed of brush carbon or other suitable material, as in the case of the trough 7. Also, the means 8 for supplying a lubricating gaseous or liquid film to the trough preferably is of such character and so disposed that the gas or liquid discharged onto the trough will be in part disposed upon the glass contact surface of the member 9.

In the form of construction shown in Fig. 1, the member 9 is pivoted at its upper end, as by being secured to a horizontal rock pin 10 which is journaled in the forks 11 (see Fig. 5) of a traveling head piece 12 which is secured adjustably, as at 13, onto the end portion of a piston rod 14. The piston rod 14 is reciprocated along a path parallel with the trough or chute 7 by a piston 15, working in a cylinder 16. The cylinder 16 may be supported by a base 17, and may support the trough or chute 7 or the latter may be supported by any suitable means.

An operating arm 20 is operable to swing the supplemental glass supporting member 9 about the axis of the horizontal pin 10 as a fulcrum. The operating arm 20 may be secured to the pin 10 and carries a roller 21 which runs on a track 22 having an inclined or cam surface 23. This track 22 may be the upper edge of a plate 24 having a right angular attaching flange 25 resting upon and adjustably secured to an underlying flange 26 of a bracket 27 that is secured to a side of the trough or chute 7, as by the fastening devices 28. The connection between the plate 24 and the bracket 27 is such as to permit longitudinal adjustment of the plate 24 along the trough or chute for a purpose that will be presently described. A simple way of effecting such connection is by the provision of bolts 29 passing through a longitudinal slot 30 in the attaching flange 25 of the plate 24 and engaging with threaded openings in the underlying portions of the bracket 27.

The operation of the form of structure that has just been described may be readily understood by consideration of Figs. 1 and 2.

In Fig. 1, the lower end of the descending stream or column 4 rests upon and is supported by the cooperative upper portion of the trough or chute 7 and the supplemental member 9. A spring 31, connecting the operating arm 20 with the head piece 12 tends to keep the member 9 in position to close the trough or chute 7 and thus in position to cooperate with the latter to support the lower end portion of the glass column or stream 4.

As glass continues to issue from the outlet 2 into the column or stream 4, the member 9 may be moved downwardly by the operation of the pneumatic device 16—15, and at a speed which may have been predetermined and regulated to produce a charge of a given length and size in a given time under given operating conditions. While the pneumatic mechanism 16—15 is shown as comprising only a cylinder and its piston and pressure fluid conducting pipes connected with the opposite ends of the cylinder, it is to be understood that any known adjuncts or equipment may be associated with these parts so as to adjust or vary the rate of downward movement of the member 9 and the extent of such movement.

As the member 9 moves downwardly along the trough at a predetermined desirable rate, the portion of the column 4 between the member 9 and the outlet will attain the length and size desired. When a charge of the length and size desired has been formed as the lower end portion of the column or stream 4, the shear blades 6 may be closed to sever such charge. This may be just before, simultaneously with, or just after the roller 20 reaches and moves along the inclined or cam portion 23 of its track so as to swing the member 9 from its glass contact position, shown in Fig. 1, to position to clear the glass in the trough or chute as shown in Fig. 2.

The separated glass charge, shown at 32 in Fig. 2, then may move downwardly in the trough or chute 7 beneath the open member 9. As shown in Fig. 2, the shear blades 6 are moving apart after a glass severing operation and the charge is just passing beneath the member 9, the latter being at the lower end of its stroke.

The pneumatic mechanism 15—16 then may act to return the member 9 upwardly and the spring 31 will assure closing of the member 9 as soon as the roller 21 has moved down the inclined portion 23 of the roller track so as to permit such closing.

It is obvious that the length of the charge may be varied by varying the lower limit of the downward movement of the member 9 before a severing operation by the shear blades 6 and before the member 9 is opened by its operating mechanism. As hereinbefore stated, the cam plate 24 may be shifted along the trough so as to vary the level at which the member 9 will be opened. The upper position of the member 9 may be adjusted by adjustment of the head piece 12 on the piston rod 14, or by adjustment of the upper limit of the stroke of the piston 15 in the cylinder 16. The adjusting devices shown are intended to represent any suitable adjusting devices for accomplishing the purposes which have been pointed out.

When the invention is embodied in a structure as shown in Figs. 3 and 4, the trough 7 may be supported on a vertically disposed piston rod 33 which projects upwardly from a piston 34 in a vertically disposed cylinder 35. The supplemental member 9 is pivotally supported by a horizontal rock pin 10a which is carried by a supporting arm 36 or a pair of these arms on a side or the sides of the trough or chute 7.

An operating arm 20a for opening and closing the member 9, with relation to the trough or chute 7, is suitably connected, as by the pin and slot arrangement indicated at 37, with the rod 38 of a piston 39 in a cylinder 40. The latter may be supported on a side of the trough or chute 7, as by a bracket 41.

With this arrangement, the opening and closing movements of the member 9 are effected by reciprocation of the piston 39 in the cylinder 40 and may be timed to take place at suitable intervals and at suitable times in the cycle of movements of the trough as it is moved vertically by the pneumatic mechanism 34—35 to control the formation of each of successive mold charge portions of a descending column or stream 4a of glass.

As shown in Fig. 3, the trough or chute is at the upper end of its path of bodily movement and the member 9 is closed, so as to cooperate with a portion of the trough 7 to support the lower end portion of the descending column or stream of glass 4a. Downward movement of the trough and the member 9 as a unit may be effected at the desired rate and to the desired extent to control the length and size of the portion of the column 4a that is to be severed to constitute the mold charge. When such portion of the glass column 4a has attained the length and size desired, the shear blades 6 may be closed to sever the charge.

Just before, concurrently with, or immediately after such severing operation, the piston 39 in the cylinder 40 may be operated to open the member 9, so that the severed charge, indicated at 42 in Fig. 4, may slide down the trough or chute. As shown in Fig. 4, the trough or chute is then at the lower end of its stroke, the piston 34 being at the lower end of the cylinder 35. The trough or chute is then returned to its raised position and the member 9 is closed so as to cooperate with such trough or chute to support the new leading end of the supply column or stream of glass from which the next charge is to be obtained.

The mechanisms shown for effecting the several movements of the trough or chute 7 and the supplemental member 9 may be supplemented by suitable timing mechanism and other well known equipment for timing and regularly controlling these several movements. The invention is not limited to the details of structure shown in the drawing or the particular modes of operation herein described, but extends to all practical embodiments of the invention and operations thereof that come within the terms of the appended claims.

I claim:

1. Glass feeding apparatus comprising a trough or chute and a supplemental glass supporting member for cooperating with said trough or chute to support the lower end portion of a column or stream of glass below an outlet from which such glass has issued, means for varying the distance below said outlet at which said trough or chute and said supplemental member support said glass, and means for effecting relative opening and closing movements between said trough or chute and said supplemental member.

2. Glass feeding apparatus comprising a means for supporting a supply body of molten glass above a feed outlet from which glass of the supply body will descend in a column or stream, a trough or chute located beneath said outlet in position to receive and support the leading end portion of said column or stream of glass while the glass of said column or stream remains integral with that of said supply body, a supplemental member movable about a substantially horizontal axis in respect to the trough or chute to and from position to cooperate with said trough or chute in receiving and supporting the leading end of said column or stream while it is integral with the glass of said supply body and to control the rate of downward movement of said supported end portion of said column or stream, and severing means operable to cut through said column or stream of glass at a plane above the place of first contact of the leading end of said column or stream with said trough or chute.

3. Glass feeding apparatus comprising a trough or chute located in position below a feed outlet to intercept the leading end of a column or stream of glass descending from said outlet, means in addition to said trough or chute and relatively movable in respect thereto for retarding the gravity descent of the intercepted glass until such intercepted glass has reached a predetermined distance below the feed outlet, and means for severing the column or stream of glass at a place above the place of contact of glass of said column or stream with said trough or chute.

4. Glass feeding apparatus comprising a trough or chute located in position to intercept the leading end of a supply column or stream of glass as the latter descends from a glass feed outlet, means cooperative with said trough or chute and movable periodically relatively thereto for retarding the gravity descent of the intercepted glass of said column or stream until a portion of the latter has attained a predetermined length and size, and means for severing said portion of the column or stream from the oncoming glass thereof.

5. The combination with means for producing a descending supply column or stream of molten glass, of an inclined trough or chute for intercepting and guiding the leading end portion of said column or stream, and a member relatively movable in respect to the trough or chute to and from a position to cooperate with said trough or chute at a place located a substantial distance above its lower end to retard temporarily the gravity descent of the intercepted glass.

6. Glass feeding apparatus comprising a trough or chute located in position to intercept and support the leading end of a column or stream of molten glass that has descended from a glass feed outlet, a movable supplemental glass supporting member for cooperating with said trough or chute to support said leading end of said column or stream on said chute, means for lowering said supplemental member with respect to said feed outlet while in its cooperative glass supporting relationship with said trough or chute to aid in controlling the formation of a portion of said column or stream to produce a glass charge of the length and size desired, means for severing said charge from the remainder of said column or stream, and means for moving said supplemental member out of its cooperative glass supporting relationship with said trough or chute to permit the charge to slide freely down the latter.

7. Glass feeding apparatus comprising a trough or chute located below a glass feed outlet in position to intercept the leading end of a column or stream of glass descending from said outlet, a pivoted supplemental member for closing the channel of said trough or chute at the place of contact therewith of said leading end of said column or stream of glass and thereby to cooperate with said trough or chute to support the intercepted glass, means for lowering said pivoted supplemental member while in its glass supporting cooperative relationship with said trough or chute to aid in controlling the formation of the portion of the glass of said column or stream above that in contact with said supplemental supporting member, means for severing the column or stream of glass to produce a mold charge when the glass below the severing plane has attained the desired length and size, and means for swinging the pivoted supplemental member relatively to said trough or chute to clear the channel of the latter and thus to permit the mold charge to slide freely down said trough or chute.

8. Glass feeding apparatus comprising a trough or chute located beneath a glass feed outlet in position to intercept the leading end of a column or stream of glass descending from said outlet, a movable supplemental glass supporting member located in position to cooperate with said trough or chute to support the intercepted glass of said column or stream, means for lowering said supplemental member along said trough or chute while in its cooperative glass supporting relationship with the chute and thereafter for returning said supplemental member to its initial position in respect to said trough or chute, means for severing the column or stream of glass at a plane above that at which such glass contacts with said trough or chute, and means for operating said supplemental member to clear the previously supported glass on said trough or chute.

9. Glass feeding apparatus comprising a trough or chute located beneath a glass feed outlet in position to intercept the leading end of a column or stream of glass descending from said outlet, a supplemental glass supporting member movable relatively to said trough or chute to and from position to cooperate with the latter to support said intercepted glass and means for moving said trough or chute and said supplemental member bodily as a unit in the direction of movement of the glass of said column or stream while in supporting contact with the intercepted glass of said column or stream.

10. Glass feeding apparatus comprising a trough or chute located below a glass feed outlet in position to intercept the leading end of a column or stream of glass descending from said outlet, a pivoted supplemental member for closing the channel of said trough or chute at the place of contact therewith of said leading end of said column or stream of glass and thereby to cooperate with said trough or chute to support the intercepted glass, means for lowering said pivoted supplemental member while in its glass-supporting cooperative relationship with said trough or chute to aid in controlling the formation of the portion of the glass of said column or stream above that in contact with said supplemental supporting member, means for severing the column or stream of glass to produce a mold charge when the glass below the severing plane has attained the desired length and size, and means for swinging the pivoted supplemental member relative to said trough or chute to clear the channel of the latter and thus to permit the mold charge to slide freely down said trough or chute.

LLOYD G. BATES.